Figure 1:
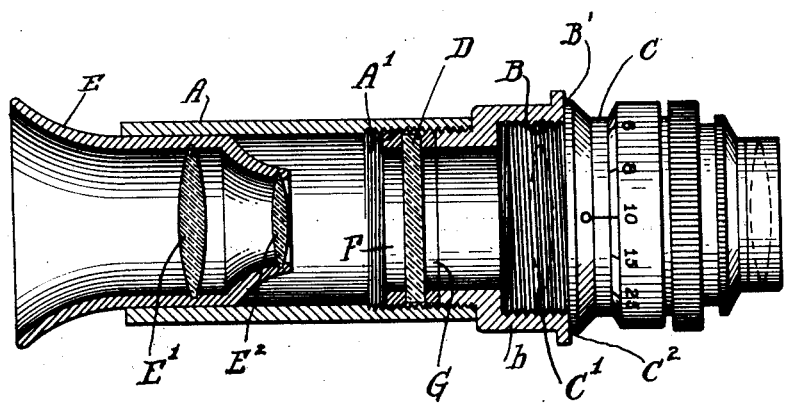

Aug. 30, 1927.

L. F. DEMING 1,640,694

CAMERA LENS FOCUSING APPLIANCE

Filed Aug. 28, 1925

INVENTOR
Lucius F Deming
BY
John E. Hubbell
ATTORNEY

Patented Aug. 30, 1927.

1,640,694

UNITED STATES PATENT OFFICE.

LUCIUS F. DEMING, OF PHILADELPHIA, PENNSYLVANIA.

CAMERA-LENS-FOCUSING APPLIANCE.

Application filed August 28, 1925. Serial No. 53,009.

The general object of the present invention is to provide improved means for focusing camera lenses. More specifically, the object of the invention is to provide a simple and effective device for use in determining the required focal adjustment of the so-called focusing lens mounts employed in connection with certain kinds of cameras, and particularly, with the small, or so-called hand motion picture camera.

The effective use of motion picture cameras requires the use of a plurality of focusing lens mounts adapted for interchangeable use in the camera and one or the other of which is used in taking any particular series of pictures according to the character of the object to be photographed, the distance between the object and the camera, or other conditions of use. Such an interchangeable focusing lens mount comprises a barrel having a threaded end adapted to be screwed into the lens mount seat provided for the purpose in the camera, and lenses forming a lens system which may be adjusted, ordinarily by rotating one part of the barrel relative to the other, to bring the object to be photographed into focus on the camera film. Such focusing mounts are usually provided with an index or indices for the purpose of showing what adjustment of the focusing mount is required in photographing an object at a given distance from the camera, but with ordinary commercial focusing lens mounts, the indications of the focal adjustment required which are furnished by the index markings on the mount cannot be relied upon, at least for the full range of adjustment required, even when the distance between the camera and the object to be photographed is accurately known, and in general moreover that distance is not accurately determined, but must be approximated.

In accordance with the present invention, the focal adjustment of a focusing lens mount required for any particular camera exposure is determined by actually focusing the lens mount in a special focusing appliance which is constructed or adjusted for use in conjunction with the camera in which the lens mount is to be used. The appliance which I have devised for this purpose is provided with a lens mount seat which is a counterpart of the lens mount seat of the camera in conjunction with which the appliance is to be used, and is provided with a ground glass or other image receiving surface located back of and at a distance from the lens mount seat of the appliance, which is the same as the distance between the film or other image receiving surface of the camera and the camera lens mount seat. Advantageously, the image formed on or at the image receiving surface of the appliance by the lens system of a lens mount seated in the appliance, is viewed through a magnifying glass like a jeweler's eye-piece which is mounted in, and forms a part of the appliance of the image receiving surface thereof. For hand motion picture cameras, the appliance may well be entirely separate from the camera, but in some cases, the appliance may be attached to the camera with which it is to be used.

The various features of novelty which characterize my invention are pointed out with particularity in the claims annexed to and forming a part of this specification. For a better understanding of the invention, however, and its advantages, reference should be had to the accompanying drawings and descriptive matter in which I have specified preferred embodiments.

Figure 2:
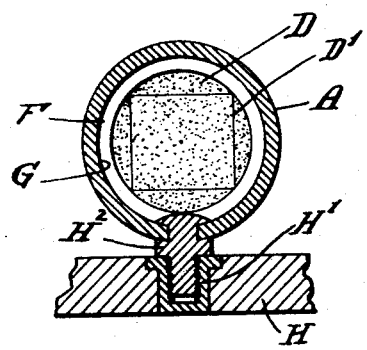

Of the drawings:

Fig. 1 is a sectional elevation of the focusing appliance with a lens mount seated therein; and Fig. 2 is a transverse section through a modified form of focusing appliance, and a portion of the camera on which the appliance is mounted.

The focusing appliance shown in Fig. 1 comprises a barrel or tubular body A provided with a seat B for a focusing lens mount C. Mounted within the barrel A is a disc member D providing an image receiving surface. The member D may well be a piece of translucent material as ground glass or celluloid. At the opposite end of the barrel A from the lens mount seat B is an inspection opening in which, in the preferred construction illustrated, there is mounted an eye-piece E, containing a magnifying lens or lens system adapted to magnify the image formed on the image receiving member D by the lens mount C. As shown, the eye-piece E is like a jeweller's eye-piece of conventional form comprising lenses $E'$ and $E^2$ mounted in the usual lens holder, which may be permanently or detachably secured in the corresponding end of the barrel A.

As shown, the body portion of the barrel A is a tube having its end remote from the eye-piece E internally threaded at A' to receive an externally threaded collar F against which the marginal portion of the rear side of the image receiving member D bears. As shown, also, the lens mount seat B is formed in a separate member *b* having a reduced externally threaded portion at its rear end which is screwed into the threaded portion A' of the body of the barrel. The inserted end of the member *b* may be employed to hold the member D in place against the collar F, either by direct engagement, or as shown, by means of an interposed washer G. The seat B in the usual form shown, comprises a threaded socket receiving the usual externally threaded camera seat engaging end C' of the lens mount C, and the member *b* is advantageously formed with a flange at its front end to provide an extended surface B' against which bears the rear side of the usual collar $C^2$ formed on the lens mount at the outer end of its threaded portion C'. The surface B' and threaded socket of the part *b* provide a seat B for the lens mount C, which should be a counterpart of the lens seat of the camera in which the lens mount C is to be used after being focused, and the image receiving surface of the member D is located at a distance back of the lens mount seat B of the member *b*, which is the same as the distance between the lens mount seat of the camera and the film or other image receiving surface of the camera.

With the lens mount C seated in the focusing appliance A, the lens mount is focused by manipulating its focusing provisions as required to bring the image of the object to be photographed out clearly on the member D. The appliance obviously permits of a sharp focal adjustment of the lens mount. The magnifying eye-piece E is especially useful when the appliance is used in conjunction with a hand motion picture camera, because of the small size of the image formed. When the lens mount C has been given a proper focal adjustment, the lens mount is removed from the focusing appliance and inserted in the camera, which is then ready to photograph the object on which the lens mount has been focused provided the camera is located in the same position or at the same distance from the object as was the focusing appliance when the lens mount received its focal adjustment. In transferring the lens mount C from the focusing appliance A to the camera, care must be taken to avoid disturbing the focal adjustment of the lens mount C, unless at least, note has been taken of the index reading of the lens mount focal adjustment made in the appliance preparatory to transferring the lens mount to the camera.

The focusing appliance A required for use with an ordinary hand motion picture camera will ordinarily be about an inch in diameter and about three inches long, so that it can be readily carried in the hand or pocket of the operator or stowed away in the camera case, and the construction of the focusing appliance is such as to permit of its production at a relatively low cost. While ordinarily no adjustment is required in an appliance A made for use in conjunction with any one style or pattern of camera, the appliance A can be adjusted for use with cameras in which the distance between the film surface and lens mount seat are different, by merely adjusting the member D longitudinally of the barrel of the appliance. Such adjustment can readily be effected with the construction illustrated by the interchangeable use of washers G of different thicknesses and corresponding adjustments of the collar F in its threaded seat. This has the advantage, of course, of reducing the number of sizes of appliances required to supply users of different types or makes of cameras. The use of the appliance tends to the production of better pictures under practically all conditions of operation, and in the case of ordinary amateur use, greatly reduces the exasperating and expensive wastage of film due to improper focal adjustment of the camera lenses. In the case of a hand motion picture camera, the lenses ordinarily provided in connection with the camera are adapted to photograph objects at distances from the camera ranging from several hundred feet down to six inches or so, the latter distance being required in making film titles by photographically reproducing ordinary typewriting or small hand lettering, or in taking close up pictures of small objects.

The invention is of especial practical importance with the fast or large aperture lenses now largely used and of which the tendency of the art is to make increasing use, and which require much sharper focusing than do ordinary camera lenses. Indeed on account of the decreased field depth with a fast or large aperture lens an almost microscopically fine focal adjustment is required for really good results.

In the modification shown in Fig. 2, the body A of the focusing appliance is provided with a radially projecting threaded stud $H^2$ adapted to be screwed into a threaded socket H' formed in the case H of a camera with which the appliance is used. Of course, other means may be employed for detachably or permanently attaching the focusing appliance to a camera initially constructed for use with such appliance, or which can be readily provided with means to facilitate the attachment. Those skilled in the art will realize, of course, that other changes in form of the appliance may be made without departing from the principle of the invention set forth in the appended claims.

If desired the image receiving surface on the member D may have outlined on it, as indicated at D', the field or area within which the image of the object must fall, such field or area corresponding, of course, to the area of the camera film receiving an individual exposure.

Having now described by invention what I claim as new and desire to secure by Letters Patent, is:

1. An appliance for determining the required focal adjustment of a camera focusing lens mount having a seat engaging portion for its detachable connection to a camera with which the mount is to be used, said appliance comprising a chambered body provided at one end with a seat for the seat engaging portion of the mount, and at the opposite end with an inspection opening, and means within said body providing an image receiving surface at a fixed distance from said seat on which the image of an object to be photographed may be seen through said inspection opening when a focusing lens mount seated in the appliance is focused on said object.

2. The appliance of claim 1 further characterized by means associated with said body by which the distance from the lens mount seat of the appliance at which the image receiving surface of the appliance is fixed may be varied in assembling the appliance.

3. The appliance of claim 1 further characterized by the magnifying eye-piece mounted in the inspection opening of the appliance.

4. The appliance of claim 1 further characterized by means for detachably connecting said body to a camera in conjunction with which the appliance is to be used.

5. The combination with a camera, of a focusing appliance mounted thereon and comprising a chambered body provided at one end with a seat for the seat engaging portion of a focusing lens mount adapted for interchangeable use in said camera and said appliance, and provided at its opposite end with an inspection opening, means within said body providing an image receiving surface on which the image of an object to be photographed may be seen through said inspection opening when said lens mount is mounted in said seat and is focused on said object, said surface being located at a fixed distance from said seat corresponding to the distance between the lens seat and image receiving surface of the camera proper.

6. A lens tube for a camera having its rear end adapted to be inserted into the camera to a predetermined distance from the sensitive surface therein, the lens being adjustable relative to said rear end, in combination with a second tube adapted to removably receive the lens tube to a predetermined distance, and having a translucent plate at a distance from the rear end of the lens tube equal to that of said sensitive surface therefrom, whereby the lens tube having been inserted in the second-named tube and its lens adjusted to focus the scene upon said plate, the lens tube can then be transferred to the camera with full assurance of being in proper focus therefor.

Signed at Philadelphia, in the county of Philadelphia, and State of Pennsylvania, this twenty sixth day of August, A. D. 1925.

LUCIUS F. DEMING.